United States Patent
Higby et al.

(10) Patent No.: US 11,991,277 B2
(45) Date of Patent: May 21, 2024

(54) CRYPTOGRAPHIC HARDWARE SECURITY MODULE WITH SECURE EMBEDDED HEAT PIPE

(71) Applicant: International Business Machines Corporation, Armonk, NY (US)

(72) Inventors: Arthur J. Higby, Cottekill, NY (US); David Clifford Long, Wappingers Falls, NY (US); Edward N. Cohen, Kingston, NY (US); John R. Dangler, Rochester, MN (US); Matthew Doyle, Chatfield, MN (US); Philipp K. Buchling Rego, Wappingers Falls, NY (US); William Santiago-Fernandez, Hopewell Junction, NY (US); Levi Campbell, Poughkeepsie, NY (US); James Busby, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 17/404,071

(22) Filed: Aug. 17, 2021

(65) Prior Publication Data
US 2023/0054606 A1 Feb. 23, 2023

(51) Int. Cl.
*H04L 9/08* (2006.01)
*F28D 15/02* (2006.01)

(52) U.S. Cl.
CPC ........ *H04L 9/0877* (2013.01); *F28D 15/0275* (2013.01)

(58) Field of Classification Search
None
See application file for complete search history.

(56) References Cited

U.S. PATENT DOCUMENTS

| 7,323,986 B2 | 1/2008 | Hunter et al. |
| 7,551,444 B2 | 6/2009 | Anderl et al. |
| 10,209,726 B2 | 2/2019 | Hovis et al. |

(Continued)

FOREIGN PATENT DOCUMENTS

| CN | 106535594 A | 3/2017 |
| CN | 111788876 A | 10/2020 |
| WO | 2017044379 A1 | 3/2017 |

OTHER PUBLICATIONS

International Search Report; International Application No. PCT/CN2022/109067; International Filing Date: Jul. 29, 2022; Date of mailing: Oct. 10, 2022 ; 9 pages.

*Primary Examiner* — Syed A Roni
(74) *Attorney, Agent, or Firm* — Cantor Colburn LLP; Tihon Poltavets

(57) ABSTRACT

Aspects include a cryptographic hardware security module having a secure embedded heat pipe and methods for assembling the same. The cryptographic hardware security module can include a printed circuit board having one or more components. The cryptographic hardware security module can further include an encapsulation structure having a top can and a bottom can. The top can is fixed to a first surface of the printed circuit board and the bottom can is fixed to second surface of the printed circuit board opposite the first surface. A heat pipe is positioned between the top can and the component. The heat pipe includes two or more 180-degree bends. A portion of the heat pipe extends beyond a secure region of the encapsulation structure.

18 Claims, 8 Drawing Sheets

(56) References Cited

U.S. PATENT DOCUMENTS

| | | |
|---|---|---|
| 2019/0261506 A1* | 8/2019 | Fadden ................ H05K 1/0275 |
| 2020/0285778 A1 | 9/2020 | Soffer |
| 2020/0305308 A1 | 9/2020 | Kim et al. |
| 2021/0055059 A1 | 2/2021 | Lee et al. |

* cited by examiner

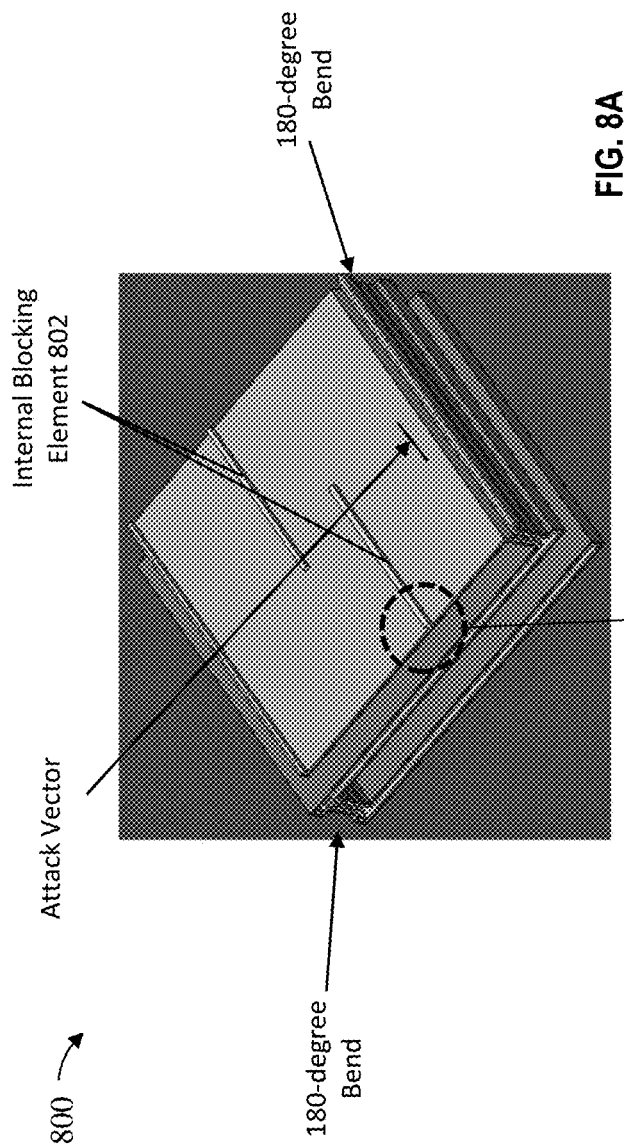
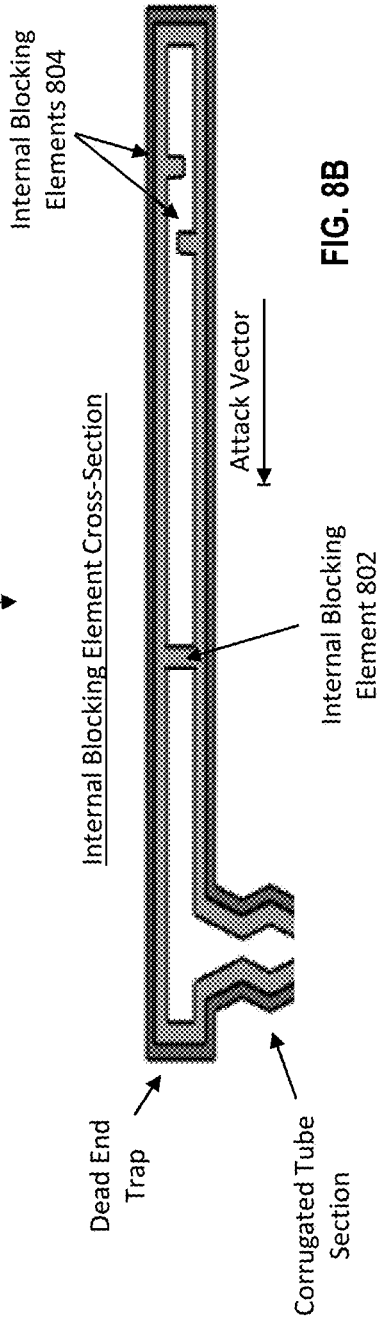
FIG. 8A
FIG. 8B

CRYPTOGRAPHIC HARDWARE SECURITY MODULE WITH SECURE EMBEDDED HEAT PIPE

BACKGROUND

The present invention generally relates to hardware security systems, and more specifically, to a cryptographic hardware security module having a secure embedded heat pipe.

Ensuring and maintaining the security of a computer system is challenging. One way that computer systems are secured is with cryptography. Cryptographic systems rely on one or more cryptographic keys to protect information. In many situations the security of the cryptographic keys themselves is paramount because access to the cryptographic keys allows access to the data that is being protected. Cryptographic keys can be secured through the use of a hardware security module ("HSM"). Hardware security modules are general-purpose computing environments that can withstand both physical and logical attacks. HSMs typically include specialized hardware to perform cryptographic operations (e.g., safeguard, house, and manage cryptographic keys) and to prevent unauthorized access or tampering. Generally speaking, an HSM safeguards cryptographic keys by storing the cryptographic keys within a tamper-resistant physical device.

HSMs provide cryptographic key generation and storage and perform cryptographic operations for authorized clients of the HSM. In general, cryptographic keys are not exportable from the HSM in an unprotected form. The HSM is accessed from a host computer system using a carefully designed set of API functions. The application programming interface (API) functions may be generic, or they may be designed to meet the special requirements of a particular industry, such as banking and finance.

SUMMARY

Embodiments of the present invention are directed to a cryptographic hardware security module having a secure embedded heat pipe. A non-limiting example of the cryptographic hardware security module includes a printed circuit board having one or more components. The cryptographic hardware security module can further include an encapsulation structure having a top can and a bottom can. The top can is fixed to a first surface of the printed circuit board and the bottom can is fixed to second surface of the printed circuit board opposite the first surface. A heat pipe is positioned between the top can and the component. The heat pipe includes two or more 180-degree bends. A portion of the heat pipe extends beyond a secure region of the encapsulation structure.

Embodiments of the present invention are directed to methods for forming a cryptographic hardware security module. A non-limiting example method includes providing a printed circuit board having one or more components. The printed circuit board is encapsulated in an encapsulation structure that includes a top can and a bottom can. The top can is fixed to a first surface of the printed circuit board and the bottom can is fixed to second surface of the printed circuit board opposite the first surface. The method includes positioning a heat pipe between the top can and the component. The heat pipe can include two or more 180-degree bends. A portion of the heat pipe extends beyond a secure region of the encapsulation structure.

Embodiments of the present invention are directed to methods for assembling a cryptographic hardware security module. A non-limiting example method includes providing an encapsulation structure having a top can, a bottom can, a top flex, and a heat pipe cover flex. A first end of a heat pipe is slid through a slot in the top flex. The heat pipe can include two or more 180-degree bends. A mechanical retention part is slid between the heat pipe and the top flex and a second end of the heat pipe is slid through a slot in the heat pipe cover flex. The top can is fixed to a first surface of a printed circuit board and one or more screws are installed to fasten the mechanical retention part to the printed circuit board. The bottom can is fixed to a second surface of the printed circuit board opposite the first surface, completing the encapsulation.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 8A depicts an isometric view of an embedded heat pipe constructed in accordance with one or more embodiments of the present invention;

FIG. 8B depicts a detailed cross-sectional view of the embedded heat pipe depicted in FIG. 8A.

DETAILED DESCRIPTION

Figure 1:
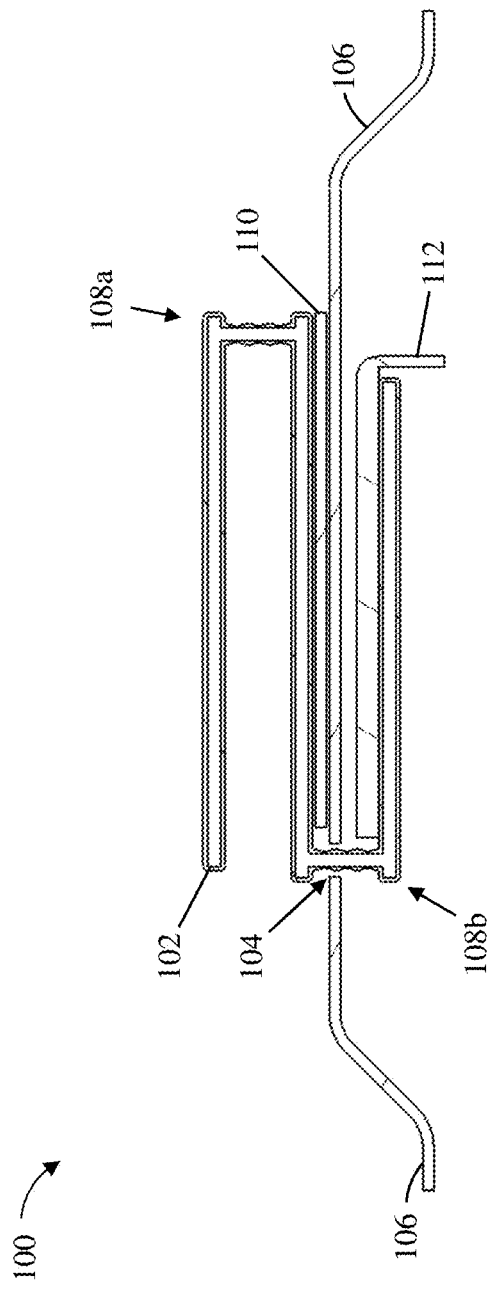
FIG. 1 depicts a cross-sectional view of a cryptographic hardware security module having a secure embedded heat pipe in accordance with one or more embodiments of the present invention.

Hardware security modules (HSMs) are general-purpose computing environments that ensure the security and integrity of the underlying hardware and software of a device by safeguarding the hardware and software within a tamper-resistant envelope. The Federal Information Processing Standards 140 (FIPS 140) provides four standardized levels of security for HSMs. Level 1 is the lowest level of security and covers the basic security features in a cryptographic module. Level 4, conversely, is the most secure part of the 140 standard. Level 4 security requires tamper detection circuits that are configured to detect device penetration. This level can be used when cryptographic modules are in a physically unprotected environment that intruders can directly access. For example, many servers operate in remotely distributed environments where it is difficult or impossible to provide complete physical security for sensitive processing. In some applications, the motivated adversary is the end user. In short, level 4 compliant HSMs offer trust even when you cannot control its environment or prevent physical access. Module protection in level 4 extends to keeping voltage and temperature conditions within normal operating ranges. Level 4 compliant modules must be able to detect fluctuations in these parameters and can zeroize themselves if necessary.

Current level 4 compliant HSMs are typically constructed as multi-chip boards potted with an epoxy material to provide very strong security. Several designs use an enclosed volume the completely envelops the protected component(s) (e.g., around the top and bottom sides of a printed circuit board). These HSMs can include, for example, top and bottom cans that provide a completely enclosed module, a tamper controller, and in some cases, each can is configured with a fine-pitch flex circuit(s) providing electrical tamper detection and continuous monitoring. HSMs also ensure perimeter security using, for example, PCB security traces that will break if the device is breached.

While current level 4 compliant HSMs provide a high level of security, these designs are complex and challenging to manufacture. For example, the top can and associated flex circuits are often assembled as a unit, comprised of a top can heatsink, side flex, top flex, and heat spreader (these components can be collectively referred to as the top can-to-card assembly). The bottom can is similarly constructed, although bottom cans do not usually include a separate heat spreader. The top can assembly is dropped down over the underlying components and, together with the bottom can assembly, provides a protective envelope for the underlying components. In a typical module, the underlying components (e.g., CPUs) are themselves covered by heat-dissipating components (e.g., heatsinks).

As a result of the HSM assembly process and required design tolerances, a significant gap exists between the heat spreader (typically in the top can assembly) and the heat dissipating components (e.g., the heat sinks for the various components on a PCB). This requires a gap filler, typically a thermal interface material (TIM), and represents a significant thermal impedance in the overall thermal stack of the HSM design. In fact, TIM impedance represents up to a 5 degrees Celsius temperature rise in protected components of an HSM (e.g., an ASIC). In some configurations, this temperature rise can be even higher. In addition, the flex circuit(s) represent an additional significant thermal impedance in the overall thermal stack of the HSM design, in some configurations even greater than that of the TIM.

One or more embodiments of the present invention address one or more of the above-described shortcomings by providing a cryptographic hardware security module having a secure embedded heat pipe. The embedded heat pipe is configured to provide direct contact between heat dissipating components and the top can, bypassing the large thermal impedance resulting from the flex circuit(s), as well as the use of gap-filling TIMs between the heat spreader and the heat dissipating components in conventional HSM designs.

Embodiments of the present invention leverage the embedded heat pipe to transfer heat from the internal heat-dissipating components directly to the top can of the secure enclosures. In other words, the embedded heat pipe extends beyond the secure envelope to contact the top can directly. In this manner, the heat transfer mechanism can bypass the security layer without compromising security. The thermal performance improvement of a hardware security module having secure embedded heat pipes formed according to one or more embodiments was measured using computational fluid dynamics (CFD) modeling and compared to conventional HSM designs. Notably, using the embedded heat pipe resulted in a thermal performance improvement of at least 13 percent under conservative assumptions. The thermal performance improvement was sufficient to provide an increase in supportable ASIC power of at least 5 W over conventional designs under the same assumptions, at constant temperature.

The embedded heat pipe includes one or more internal features to prevent direct access through heat pipe to the underlying protected components. In some embodiments of the invention, for example, the heat pipe is constructed with two or more 180-degree bends between the hot surface (i.e., component side) and the cold surface (i.e., top can side) to prevent a straight attack pass through the heat pipe. Embedded heat pipes formed according to one or more embodiments can also include dead-end traps positioned at one or all bend regions of the heat pipe. These dead-end sections, when placed at each corner of the bend regions, can counter physical attacks attempting to break into the HSM through the heat pipe by preventing further movement of the attacking element (e.g., drill bit and/or probe).

To ensure mechanical stability, the embedded heat pipe can be configured as a flexible heat pipe that leverages one or more corrugated tube sections to account for design tolerances such as thermal or mechanical effects (expansion, contraction) experienced during operation or during construction. For example, the heat pipe can feature corrugated tube sections at the bends if needed to account for assembly tolerance because of the multiple bend requirements. A flexible heat pipe also ensures a consistent bond line regardless of can-to-ASIC gap size. In some embodiments of the invention, retention features are used to control bond lines while only allowing for z-direction movement and no rotation (here, the z-direction refers to the direction normal to the top surface of the assembly).

In some embodiments of the invention, thermal efficiency can be improved by shortening the path length of the "middle" section of the embedded heat pipe. As used herein, the "middle" section refers to that section which lies between the two 180-degree bends (or, in a configuration having more than two 180-bends, that section which is between the first and last bends). Shortening the middle section relative to the top and bottom sections, and correspondingly, the overall length of the entire heat pipe, improving heat transfer to the top can enclosure without sacrificing the security afforded by the 180-degree bends and dead-end sections.

Advantageously, hardware security modules having secure embedded heat pipes according to one or more embodiments can be fabricated using known processes. While the particular manner used in manufacturing the embedded heat pipe is not meant to be particularly limited, several known manufacturing processes can be used, such as, for example, electroforming and electroplating to achieve the small, complex geometries required for the bends in the heat pipe design. Other processes, such as brazing the horizontal and vertical sections together, or 3-D printing, can also be used to create this geometry. In some embodiments of the invention, a combination of electroforming and electroplating, brazing, and/or 3-D printing can be used together.

Moreover, hardware security modules having secure embedded heat pipes formed according to one or more embodiments are compatible with any level of FIPS security, including FIPS 140 level 4. The hardware security modules can include, for example, active tamper monitoring as provided by several tamper sensors, such as folded and formed fine pitch flex circuits.

The fabrication process for the complete assembly can use various high bond strength and thermally conductive adhesives to assemble tamper sensor(s) and the heat pipe into the top/bottom can. In some embodiments of the invention, assembly can be simplified by eliminating thermally enhanced adhesives (e.g., TIM) from one or more points in the enclosure (can require tight process controls).

FIG. 1 illustrates a cross-sectional view of a cryptographic hardware security module 100 having a secure embedded heat pipe in accordance with one or more embodiments of the present invention. As shown in FIG. 1, a heat pipe 102 can be slid through a slot 104 in a top flex 106. In some embodiments of the invention, the heat pipe 102 includes two 180-degree bends 108a, 108b (as shown). Although shown with two bends for ease of illustration and discussion, it should be understood that the number of bends in a particular application is not meant to be particularly limited. In some embodiments of the invention, the number of bends is increased (e.g., 3, 4, 5, 6, 10, etc.) and all such configurations are within the intended scope of the disclosure. It should be further noted that an inherent tradeoff exists between security and thermal efficiency. In particular, the difficulty in penetrating the heat pipe increases as the number of bends increases, while the thermal efficiency decreases with increasing heat pipe length (as needed to accommodate additional bends).

In some embodiments of the invention, an adhesive 110 is used to bond the surface of the top flex 106 to the heat pipe 102. The adhesive 110 can include a general adhesive, solder, or a combination of adhesive and solder. In some embodiments of the invention, the adhesive 110 is placed on the top flex 106 and/or the heat pipe 102 prior to inserting the heat pipe 102 through the slot 104. In some embodiments of the invention, a mechanical retention part 112 is slid between a portion of the heat pipe 102 and the top flex 106. In some embodiments of the invention, the adhesive 110 is cured once the mechanical retention part 112 is installed.

Figure 2:
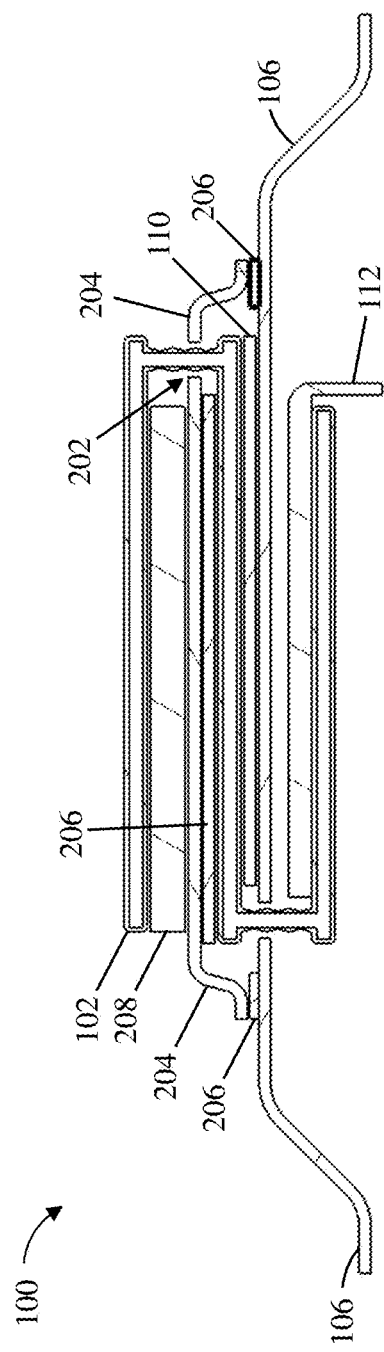
FIG. 2 depicts a cross-sectional view of a cryptographic hardware security module after incorporating a heat pipe cover flex in accordance with one or more embodiments of the present invention.

FIG. 2 illustrates a cross-sectional view of the cryptographic hardware security module 100 after incorporating a heat pipe cover flex in accordance with one or more embodiments of the present invention. As shown in FIG. 2, the heat pipe 102 can be slid through a slot 202 in a heat pipe cover flex 204. In some embodiments of the invention, additional adhesive (or solder, or both) 206 is placed between the heat pipe cover flex 204 and the heat pipe 102 and between the heat pipe cover flex 204 and the top flex 106.

In some embodiments of the invention, the additional adhesive 206 is cured to bond the heat pipe cover flex 204 to the heat pipe 102 and the top flex 106. In some embodiments of the invention, the heat pipe cover flex 204 includes one or more elements (not shown) for connecting one or more interconnect cables (not shown) from a printed circuit board (PCB) (shown in FIG. 4).

In some embodiments of the invention, a gap filler 208 is positioned between the heat pipe 102 and the heat pipe cover flex 204. The gap filler 208 can include an elastomer, silicon rubber, adhesive, or a combination thereof. In some embodiments of the invention, the gap filler 208 is slid into a gap between the heat pipe 102 and the heat pipe cover flex 204. In some embodiments of the invention, the gap filler 208 helps to account for any tolerance variations when attaching the top can (FIG. 3).

Figure 3:
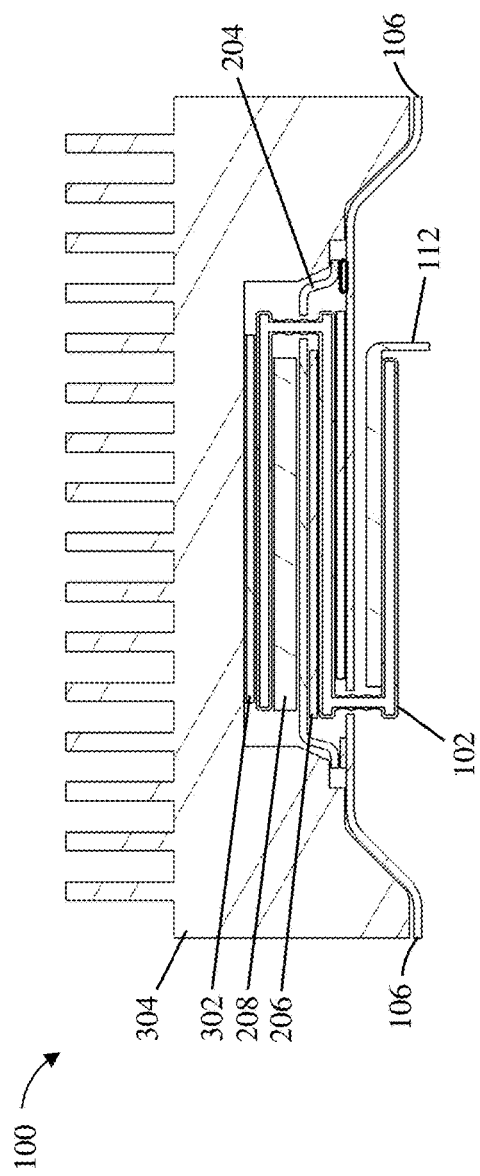
FIG. 3 depicts a cross-sectional view of a cryptographic hardware security module after incorporating a top can in accordance with one or more embodiments of the present invention.

FIG. 3 illustrates a cross-sectional view of the cryptographic hardware security module 100 after incorporating a top can in accordance with one or more embodiments of the present invention. As shown in FIG. 3, a thermal interface material (TIM) 302 is applied to a surface of a top can 304, a surface of the heat pipe 102, or a combination thereof. In some embodiments of the invention, the TIM 302 is an adhesive or solder that is dispensed into a cavity in the top can 304 prior to placing the top can 304 over the heat pipe 102. In some embodiments of the invention, the TIM 302 is cured after installing the top can 304. In some embodiments of the invention, the top can 304 includes one or more fins (as shown) to improve heat exchange with a cooling medium (e.g., air).

Figure 4:
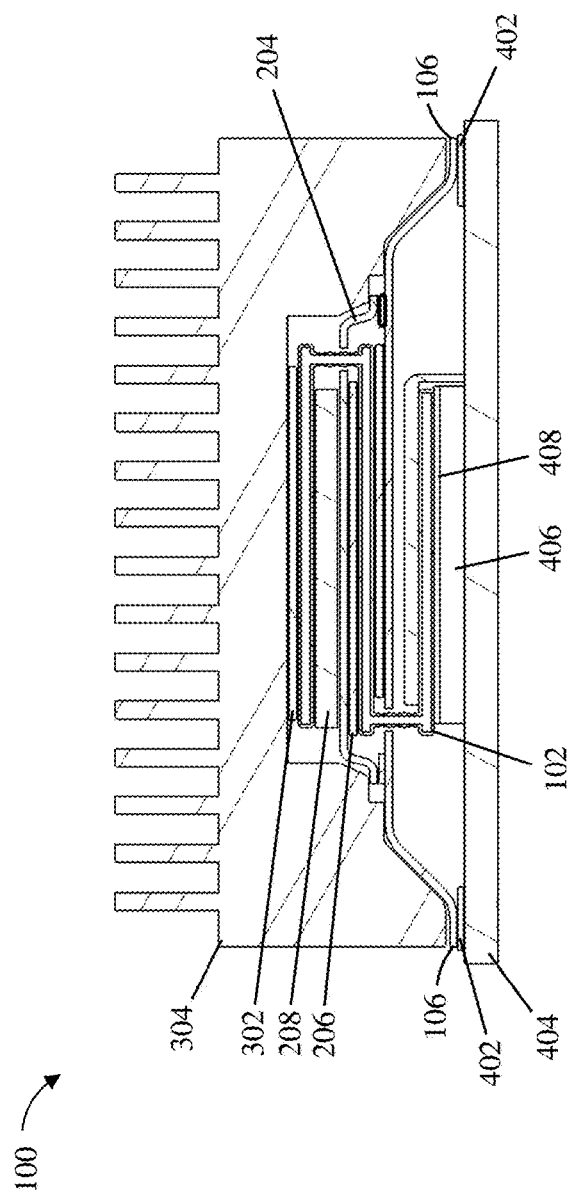
FIG. 4 depicts a cross-sectional view of a cryptographic hardware security module after incorporating a printed circuit board in accordance with one or more embodiments of the present invention.

FIG. 4 illustrates a cross-sectional view of the cryptographic hardware security module 100 after incorporating a printed circuit board in accordance with one or more embodiments of the present invention. As shown in FIG. 4, a structural adhesive 402 can be dispensed around a perimeter of a printed circuit board 404. The structural adhesive 402 can include any suitable materials, such as, for example, hysol. In some embodiments of the invention, the printed circuit board 404 includes one or more components 406 (e.g., ASIC, CPUs, etc.). In some embodiments of the invention, a TIM 408 is applied to a surface of the components 406. In some embodiments of the invention, the top can 304 is placed onto the printed circuit board 404 and is secured thereon due to the placement of the structural adhesive 402. In this manner, the top can 304 encapsulates the printed circuit board 404.

Figure 5:
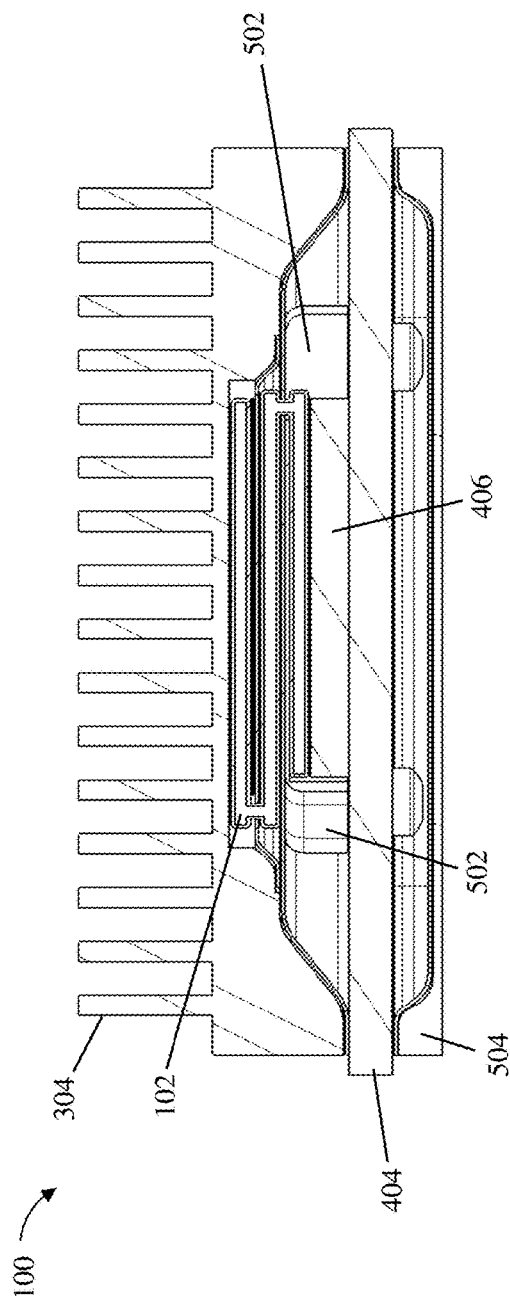
FIG. 5 depicts a cross-sectional view of a cryptographic hardware security module after incorporating a bottom can in accordance with one or more embodiments of the present invention.

FIG. 5 illustrates a cross-sectional view of the cryptographic hardware security module 100 after incorporating a bottom can in accordance with one or more embodiments of the present invention. As shown in FIG. 5, one or more screws 502 are passed through the printed circuit board 404 and into holes or threads of the mechanical retention part 112. In some embodiments of the invention, an adhesive curing step follows the installation of the screws 502. In some embodiments of the invention, a hard stop (not shown) is positioned on the bottom surface of the printed circuit board 404 so that inadvertently overtightening the screws 502 will not damage the heat pipe 102 and/or the components 406. In some embodiments of the invention, a bottom can 504 is attached to the printed circuit board 404 on an opposite side as the top can 304 to complete the secure area. The bottom can 504 can be fixed to the printed circuit board 404 using an adhesive, screws, or a combination thereof.

Figure 6:
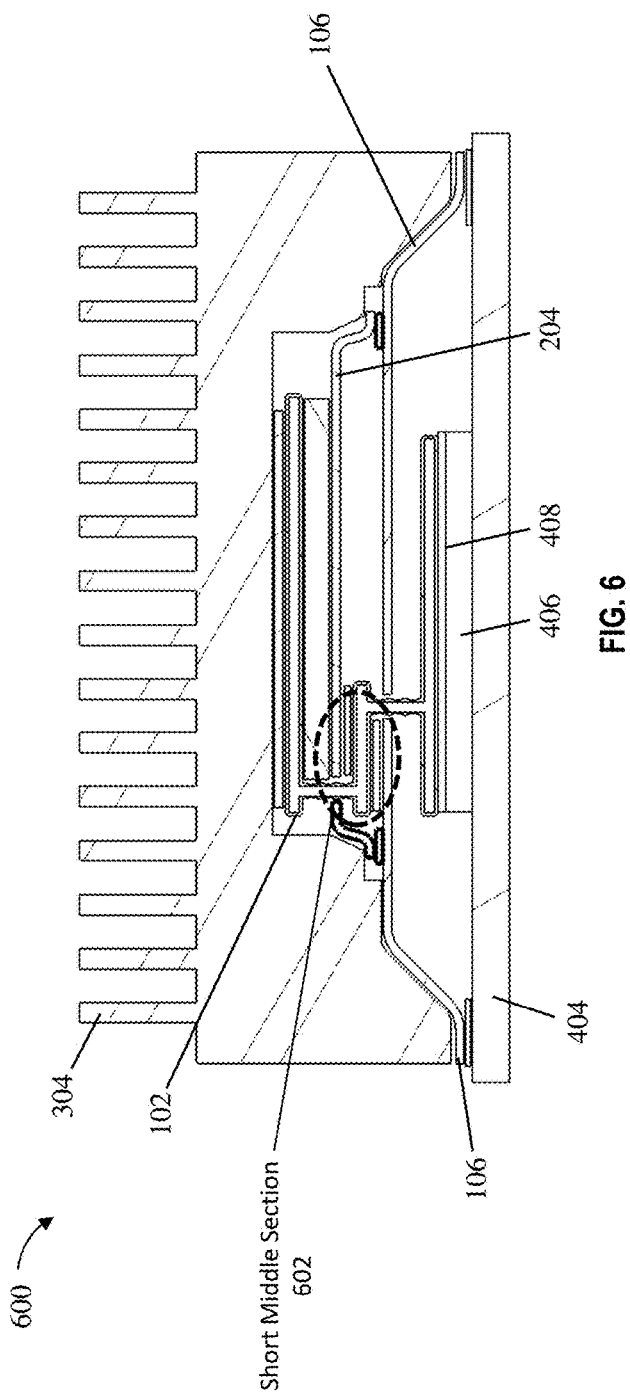
FIG. 6 depicts a cross-sectional view of a cryptographic hardware security module after incorporating a printed circuit board in accordance with one or more embodiments of the present invention.

FIG. 6 illustrates a cross-sectional view of a cryptographic hardware security module 600 after incorporating a printed circuit board in accordance with one or more embodiments of the present invention. The printed circuit board 404 can be installed in a similar manner as discussed previously with respect to FIG. 4. In contrast to the cryptographic hardware security module 100 depicted in FIGS. 1-5, FIG. 6 illustrates an alternative embodiment whereby the heat pipe 102 is configured such that the middle section 602 has a shorter run (i.e., length) than the top and bottom sections (i.e., the cold and hot sides, respectively).

Reducing the length of the middle portion of the heat pipe 102 results in a corresponding decrease in the overall length of the heat pipe 102, increasing thermal efficiency (heat transfer performance). Advantageously, security is not sacrificed as the heat pipe 102 retains the same number of 180-degree bends. Moreover, FIPS 4 requirements are maintained, as a C-shaped heat pipe (e.g., removing the middle portion entirely) provides a direct path into the secure area and is not FIPS 4 compliant.

Figure 7:
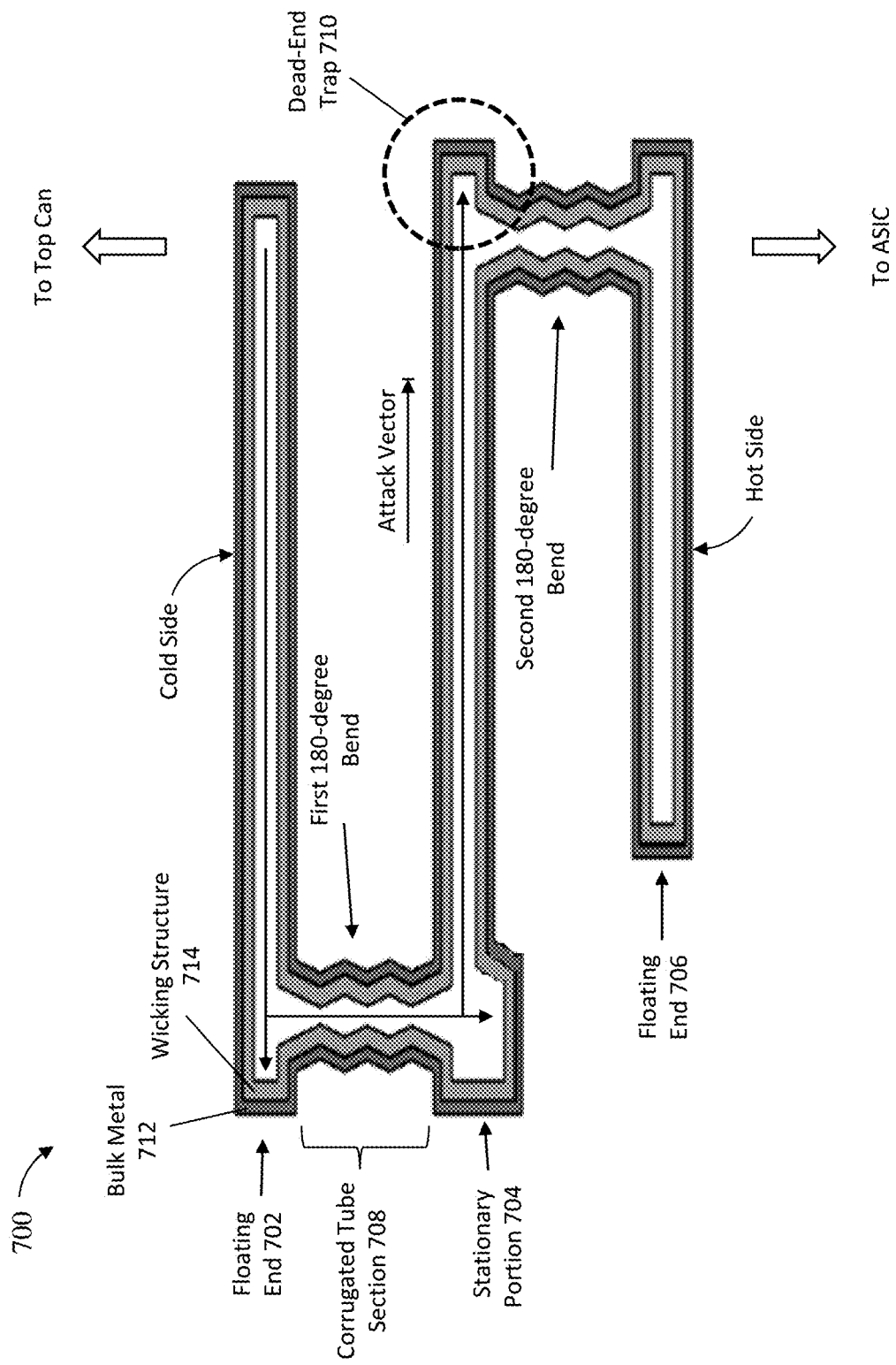
FIG. 7 depicts a detailed cross-sectional view of an embedded heat pipe in accordance with one or more embodiments of the present invention.

FIG. 7 illustrates a detailed cross-sectional view of an embedded heat pipe 700 in accordance with one or more embodiments of the present invention. As shown in FIG. 7, the embedded heat pipe 700 includes two 180-degree bends separating three portions (or runs): a floating end 702, a stationary portion 704, and a floating end 706. In some embodiments of the invention, all bonds (adhesive, solder, etc.) are made to the stationary portion 704 so that the floating ends 702, 706 are free to float as needed (e.g., expand or contract as tolerances require). As further shown in FIG. 7, the floating end 702 is on the "cold side" while the floating end 706 is on the "hot side" of the embedded heat pipe 700. As used herein, the "cold side" refers to that portion of the embedded heat pipe 700 which is closest to the top can, while the "hot side" refers to that portion which is closest to the ASIC (or other heat generating component). While shown as having two 180-degree bends with three corresponding sections (702, 704, 706), it is understood that the embedded heat pipe 700 can include any number of bends (2 or more) and a corresponding number of separated sections. For example, a 4-bend heat pipe will have 5 straight "runs".

In some embodiments of the invention, the embedded heat pipe 700 includes one or more corrugated tube section(s) 708. In some embodiments of the invention, corrugated tube sections are placed at one or more of the 180-degree bends. In some embodiments of the invention, corrugated tube sections are placed at all 180-degree bends. The corrugated tube section(s) 708 can be leveraged to account for design tolerance requirements, by allowing the embedded heat pipe 700 to slightly flex (e.g., 0.5 to 1.5 mm). This allows for the embedded heat pipe 700 to handle assembly tolerance requirements as well as providing some operating flex. In short, corrugated tube sections allow for the embedded heat pipe 700 to be somewhat flexible, ensuring a consistent bond line regardless of can-to-ASIC gap sizing.

As further shown in FIG. 7, the embedded heat pipe 700 can include one or more dead-end trap(s) 710. In some embodiments of the invention, dead-end traps are placed at the end of each straight portion adjacent to a 180-degree bend (i.e., at the end of each run). In some embodiments of the invention, dead-end traps are placed at the end of all straight portions. Advantageously, the dead-end trap(s) 710 greatly complicate the attack vectors required to access the secured portion of the device, as any tool (e.g., drill, probe, etc.) attempting to access the secure area through the heat pipe will get stuck in the dead ends.

In some embodiments of the invention, the embedded heat pipe 700 is made of a bulk conductive material, such as, for example, a metal. In some embodiments of the invention, an outer perimeter of the embedded heat pipe 700 is a bulk conductive material (e.g., bulk metal 712). In some embodiments of the invention, an inner perimeter of the embedded heat pipe 700 is a wicking structure 714 (as shown). In some embodiments of the invention, the wicking structure 714 is a high thermal conductivity material, configured with sufficient porosity to enable wicking of the condensed fluid within the heat pipe, enabling heat exchange across the length of the heat pipe.

FIG. 8A illustrates an isometric view of an embedded heat pipe 800 constructed in accordance with one or more embodiments of the present invention. As shown in FIG. 8A, the embedded heat pipe 800 includes two 180-degree bends separating three runs. As further shown in FIG. 8A, the embedded heat pipe 800 includes one or more internal blocking elements 802. In some embodiments of the invention, the internal blocking elements 802 run perpendicular to the runs of the embedded heat pipe 800. In some embodiments of the invention, the internal blocking elements 802 run perpendicular from opposite edges of the embedded heat pipe 800 (as shown). In this manner, the internal blocking elements 802 further complicate the attack vectors required to bypass the embedded heat pipe 800.

FIG. 8B illustrates a detailed cross-sectional view of the embedded heat pipe 800 depicted in FIG. 8A. As shown in FIG. 8B, the internal blocking element(s) 802 can run orthogonal to the direction of the run (and the corresponding attack vector), cutting off direct access through the respective run of the embedded heat pipe 800. The internal blocking elements 802 can be made of any material suitable for preventing an unauthorized breach, such as, for example, a metal having a higher density than the bulk material of the embedded heat pipe 800. While shown positioned in a single run (e.g., the topmost run) for ease of illustration and discussion, it should be understood that any number of internal blocking elements can be positioned along any or all of the runs of the embedded heat pipe 800. Moreover, while depicted as completely blocking the cross section of the run (i.e., the height), other configurations are possible. For example, internal blocking elements 804 are arranged to each partially block the height of the run, albeit from different directions (opposite surfaces) within the embedded heat pipe 800. Such arrangements will also prevent direct access through the embedded heat pipe 800, so long as the "gaps" (openings, cavities, etc.) at each of the internal blocking elements 804 are not aligned with respect to one another in any one dimension (otherwise, an attack vector would exist through that "gap"). In some embodiments of the invention, combinations of both types of internal blocking elements 802, 804 can be used together.

Figure 9:
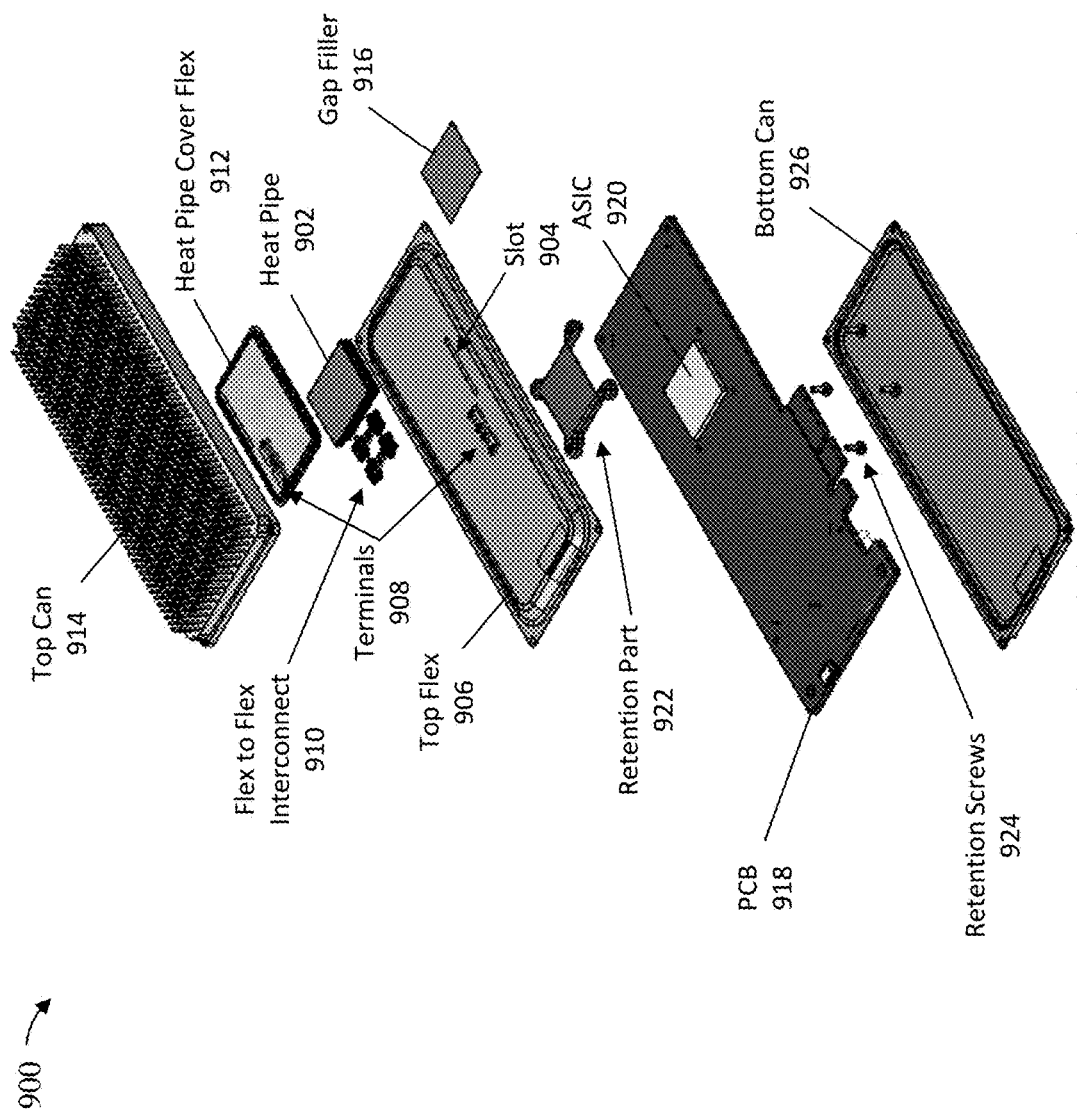
FIG. 9 depicts an expanded isometric view of a cryptographic hardware security module having a secure embedded heat pipe in accordance with one or more embodiments of the present invention.

FIG. 9 illustrates an expanded isometric view of a cryptographic hardware security module 900 having a secure embedded heat pipe 902 in accordance with one or more embodiments of the present invention. As shown in FIG. 9, the heat pipe 902 fits through a slot 904 in a top flex 906. In some embodiments of the invention, the top flex 906 includes one or more terminals 908 for connecting to an end of a flex-to-flex interconnect 910. In some embodiments of the invention, a heat pipe cover flex 912 can be fit over the heat pipe 902. In some embodiments of the invention, the heat pipe cover flex 912 includes one or more terminals 908 for connecting to a second end of the flex-to-flex interconnect 910. In some embodiments of the invention, a top can 914 is fit over the heat pipe cover flex 912 and the top flex 906. In some embodiments of the invention, a gap filler 916 is inserted between the heat pipe 902 and the top flex 906.

As further shown in FIG. 9, the top can 914 can be fixed to the top surface of a PCB 918 for encapsulation. In some embodiments of the invention, an adhesive such as hysol is applied around a perimeter of the PCB 918 and a thermal interface material is placed on one or more components (e.g., ASIC 920) prior to placing the top can 914 onto the PCB 918. In some embodiments of the invention, the PCB 918 includes a retention part 922 that can be inserted between the bottom runs of the heat pipe 902 (see, e.g., FIG. 1). In some embodiments of the invention, the retention part 922 is positioned between the top flex 906 and a component (e.g., ASIC 920) of the PCB 918. In some embodiments of the invention, retention screws 924 can be used to secure the retention part 922. In some embodiments of the invention, a bottom can 926 can be fixed to the bottom surface of the PCB 918 (i.e., opposite the top can 914).

Figure 10:
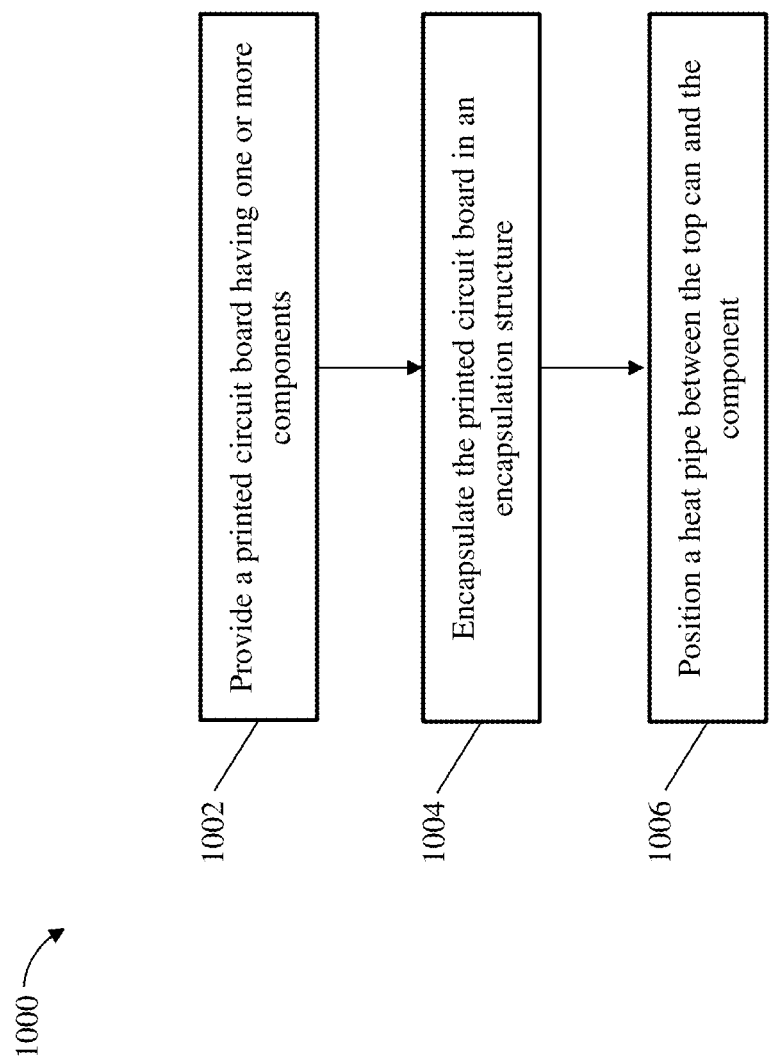
FIG. 10 is a flowchart in accordance with one or more embodiments of the present invention.

Referring now to FIG. 10, a flowchart 1000 for providing a cryptographic hardware security module having a secure embedded heat pipe is generally shown according to an embodiment. The flowchart 1000 is described in reference to FIGS. 1-9 and may include additional steps not depicted in FIG. 10. Although depicted in a particular order, the blocks depicted in FIG. 10 can be rearranged, subdivided, and/or combined. At block 1002, a printed circuit board having a one or more components is provided.

At block 1004, the printed circuit board is encapsulated in an encapsulation structure. The encapsulation structure includes a top can and a bottom can. In some embodiments of the invention, the top is fixed to a first surface of the printed circuit board and the bottom can is fixed to second surface of the printed circuit board opposite the first surface.

At block 1006, a heat pipe is positioned between the top can and the component. In some embodiments of the invention, the heat pipe is an embedded, flexible heat pipe having two or more 180-degree bends. In some embodiments of the invention, a portion of the heat pipe extends beyond a secure region of the encapsulation structure. In some embodiments of the invention, the heat pipe includes one or more dead-end traps. In some embodiments of the invention, each dead-end trap is positioned at a corner of a 180-degree bend. In some embodiments of the invention, the heat pipe includes one or more internal blocking element(s) that extend in a direction perpendicular to a run of the heat pipe. In some embodiments of the invention, at least one of the 180-degree bends includes a corrugated tube section.

The method can further include positioning a top flex between the top can and the printed circuit board. In some embodiments of the invention, the heat pipe is inserted into a slot in the top flex.

In some embodiments of the invention, the heat pipe includes a top run, a middle run, and a bottom run. In some embodiments of the invention, a length of the middle run is less than a length of the top run and a length of the bottom run. In some embodiments of the invention, the middle run is fixed and the top run and the bottom run can float.

Figure 11:
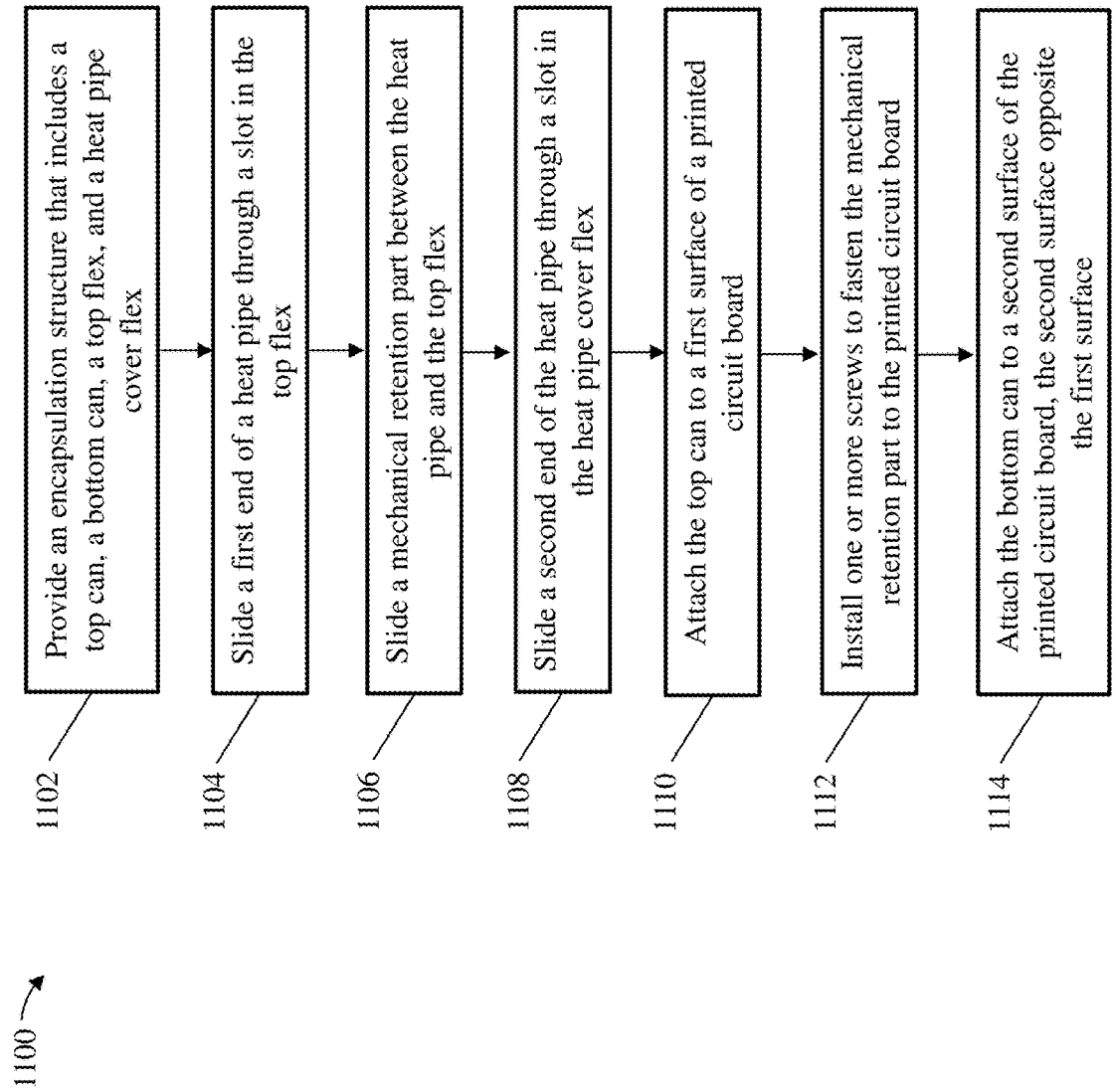
FIG. 11 is a flowchart in accordance with one or more embodiments of the present invention.

Referring now to FIG. 11, a flowchart 1100 for assembling a cryptographic hardware security module having a secure embedded heat pipe is generally shown according to an embodiment. The flowchart 1100 is described in reference to FIGS. 1-9 and may include additional steps not depicted in FIG. 11. Although depicted in a particular order, the blocks depicted in FIG. 11 can be rearranged, subdivided, and/or combined. At block 1102, an encapsulation structure having a top can, a bottom can, a top flex, and a heat pipe cover flex is provided.

At block 1104, a first end of a heat pipe is slid through a slot in the top flex. In some embodiments of the invention, the heat pipe includes two or more 180-degree bends for security. At block 1106, a mechanical retention part is slid between the heat pipe and the top flex. At block 1108, a second end of the heat pipe is slid through a slot in the heat pipe cover flex.

At block 1110, the top can is attached to a first surface of a printed circuit board. At block 1112, one or more screws are installed through the bottom surface of the printed circuit board to fasten the mechanical retention part to the printed circuit board. At block 1114, the bottom can is attached to a second surface of the printed circuit board opposite the first surface, thereby completing the encapsulation of the printed circuit board.

In some embodiments of the invention, the heat pipe includes a top run, a middle run, and a bottom run. In some embodiments of the invention, the method includes inserting a gap filling element between the top run and the heat pipe cover flex. In some embodiments of the invention, an adhesive is applied between the middle run of the heat pipe and the top flex. In some embodiments of the invention, an adhesive is applied between the heat pipe cover flex and the middle run of the heat pipe. In some embodiments of the invention, the middle run is fixed and the top run and the bottom run are allowed to float.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, conventional techniques related to semiconductor device, integrated circuit (IC), printed circuit board (PCB), printed circuit board assemblies (PCBAs), and/or surface mount technology (SMT) device and component fabrication may or may not be described in detail herein. Moreover, the various tasks and process steps described herein can be incorporated into a more comprehensive procedure or process having additional steps or functionality not described in detail herein. In particular, various steps in the manufacture of semiconductor devices and semiconductor-based ICs are well known and so, in the interest of brevity, many conventional steps will only be mentioned briefly herein or will be omitted entirely without providing the well-known process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A cryptographic hardware security system comprising:
    a printed circuit board comprising a component;
    an encapsulation structure comprising a top can and a bottom can, the top can fixed to a first surface of the printed circuit board, the bottom can fixed to second surface of the printed circuit board opposite the first surface; and
    a heat pipe positioned between the top can and the component, wherein the heat pipe comprises two or more bends, the heat pipe further comprising at least two internal blocking elements that extend in a direction perpendicular to a run of the heat pipe from opposite edges of the heat pipe, the internal blocking elements comprising a material having a higher density than a density of a bulk material of the heat pipe;
    wherein a portion of the heat pipe extends beyond a secure region of the encapsulation structure.

2. The system of claim 1, wherein the heat pipe further comprises one or more dead-end traps, each dead-end trap positioned at a corner of a 180-degree bend of the heat pipe.

3. The system of claim 2, wherein at least one of the 180-degree bends comprises a corrugated tube section.

4. The system of claim 1 further comprising a top flex positioned between the top can and the printed circuit board, wherein the heat pipe is inserted into a slot in the top flex.

5. The system of claim 1, wherein the heat pipe further comprises a top run, a middle run, and a bottom run, and wherein a length of the middle run is less than a length of the top run and a length of the bottom run.

6. The system of claim 5, wherein the middle run is fixed, and wherein the top run and the bottom run can float.

7. A method comprising:
    providing a printed circuit board comprising a component;
    encapsulating the printed circuit board in an encapsulation structure comprising a top can and a bottom can, the top can fixed to a first surface of the printed circuit board, the bottom can fixed to second surface of the printed circuit board opposite the first surface; and positioning a heat pipe between the top can and the component, the heat pipe comprising two or more bends, the heat pipe further comprising at least two internal blocking elements that extend in a direction perpendicular to a run of the heat pipe from opposite edges of the heat pipe, the internal blocking elements comprising a material having a higher density than a density of a bulk material of the heat pipe;

wherein a portion of the heat pipe extends beyond a secure region of the encapsulation structure.

8. The method of claim 7, wherein the heat pipe further comprises one or more dead-end traps, each dead-end trap positioned at a corner of a 180-degree bend of the heat pipe.

9. The method of claim 8, wherein at least one of the 180-degree bends comprises a corrugated tube section.

10. The method of claim 7 further comprising a top flex positioned between the top can and the printed circuit board, wherein the heat pipe is inserted into a slot in the top flex.

11. The method of claim 7, wherein the heat pipe further comprises a top run, a middle run, and a bottom run, and wherein a length of the middle run is less than a length of the top run and a length of the bottom run.

12. The method of claim 11, wherein the middle run is fixed, and wherein the top run and the bottom run can float.

13. A method for assembling a cryptographic hardware security module, the method comprising:

providing an encapsulation structure comprising a top can, a bottom can, a top flex, and a heat pipe cover flex;

sliding a first end of a heat pipe through a slot in the top flex, the heat pipe comprising two or more bends, the heat pipe further comprising at least two internal blocking elements that extend in a direction perpendicular to a run of the heat pipe from opposite edges of the heat pipe, the internal blocking elements comprising a material having a higher density than a density of a bulk material of the heat pipe;

sliding a mechanical retention part between the heat pipe and the top flex;

sliding a second end of the heat pipe through a slot in the heat pipe cover flex;

attaching the top can to a first surface of a printed circuit board;

installing one or more screws to fasten the mechanical retention part to the printed circuit board; and attaching the bottom can to a second surface of the printed circuit board, the second surface opposite the first surface.

14. The method of claim 13, wherein the heat pipe further comprises a top run, a middle run, and a bottom run.

15. The method of claim 14 further comprising inserting a gap filling element between the top run and the heat pipe cover flex.

16. The method of claim 14 further comprising applying an adhesive between the middle run of the heat pipe and the top flex.

17. The method of claim 16 further comprising applying an adhesive between the heat pipe cover flex and the middle run of the heat pipe.

18. The method of claim 17, wherein the middle run is fixed, and wherein the top run and the bottom run can float.

* * * * *